Sept. 13, 1966           B. W. BRACKA           3,272,458

MEANS FOR POSITIONING A ROTATING WING SLAT DEVICE

Filed Dec. 8, 1964                                 3 Sheets-Sheet 1

BRUNO W. BRACKA
*INVENTOR.*

BY Charles C. Woodward
ATTORNEY

Sept. 13, 1966 B. W. BRACKA 3,272,458
MEANS FOR POSITIONING A ROTATING WING SLAT DEVICE
Filed Dec. 8, 1964 3 Sheets-Sheet 2
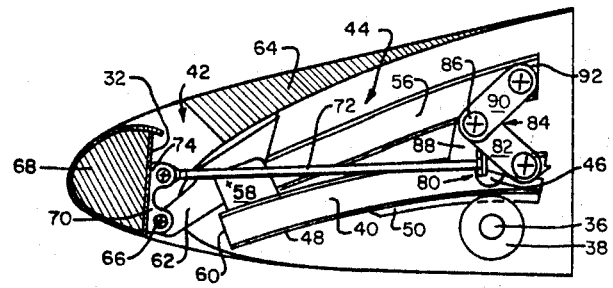
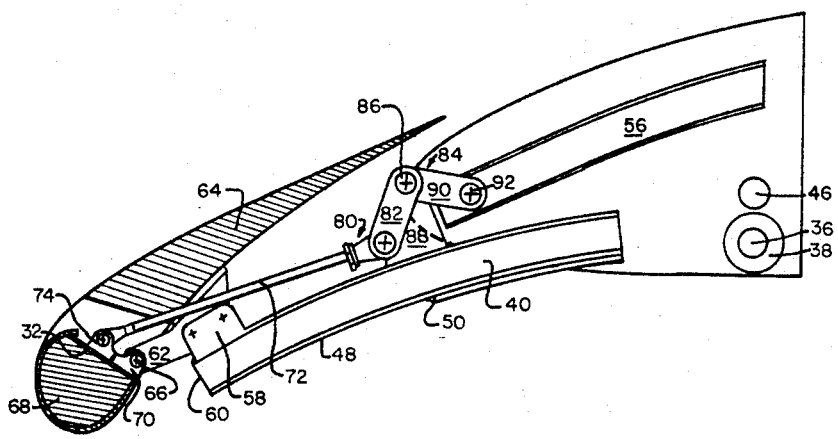
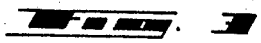
BRUNO W. BRACKA
INVENTOR.
BY *Charles W. Woodward*
ATTORNEY

BRUNO W. BRACKA
*INVENTOR.*

United States Patent Office 3,272,458
Patented Sept. 13, 1966

3,272,458
MEANS FOR POSITIONING A ROTATING WING SLAT DEVICE
Bruno W. Bracka, La Mesa, Calif., assignor to General Dynamics Corporation, Fort Worth, Tex., a corporation of Delaware
Filed Dec. 8, 1964, Ser. No. 416,865
9 Claims. (Cl. 244—42)

The present invention relates generally to mechanical actuating devices associated with movable high-lift, aerodynamic surfaces.

More particularly, the present invention relates to a mechanism which makes feasible the employment of bipartite high-lift devices in conjunction with thin-wing ultrasonic and supersonic aircraft. Further, the invention provides apparatus for varying the aerodynamic configuration and position of such airfoils in flight and in in a pre-scheduled manner, as required for a specific performance and/or condition. This is accomplished through utilization of the differential in the diverging or converging slopes or paths of two or more geometrical tracks.

The mechanism, when operated as a system, causes controlled geometric rotation of the nose portion of the object wing slat device, transforming it into a highly efficient aerodynamic body by increasing the theoretical slat chord and camber, as well as improving the aerodynamic cleanliness.

Although various mechanisms have been evolved in the past to position such devcies, none have been completely acceptable for high performance aircraft. The most successful system employed up to the present time comprises a conventional extension mechanism operative merely to drive or extend the associated slat down a system of tracks having a predetermined geometry, thus severely limiting slat configurations.

The presence of only an extension mechanism restricts the capability of the slat to that of increasing the wing chord and wing camber along a fixed geometric pattern. Thus, such geometry cannot be adjusted or varied without major modification to the wing itself. Further, such systems are incapable of effectively controlling the relationship of the slat to the fixed leading edge and are not applicable to extremely thin, high-speed airfoils because of their bulk and resultant inherent large voids in the leading edge of the wing. Since such systems are quasi-locking only, they may permit the slat to separate from the basic wing contour when aerodynamic forces of some magnitude are applied. Further, they generally require rub strips to prevent galling of the fixed leading edge of the wing during extension and retraction.

In addition, such systems generally require "stepping" in the extended position, thereby disrupting leading edge geometry at slat junctions. As a result, these slats are unable to maintain the optimum aerodynamic configuration for any given wing station. Other objections to such systems reside in their inoperability in trans-sonic (650+m.p.h.) speeds because of inherent inability to fullfill aerodynamic requirements and withstand aerodynamic loading, thus significantly restricting maneuverability at trans-sonic speeds.

These and many other undesirable characteristics are overcome by employment of the unique mechanisms of the present invention.

The mechanism of the present invention is operative to vary both the shape and geometric trajectory of a variable geometry airfoil, thus increasing wing camber and chord length as well as theoretical slat chord and camber.

Obviously, such a characteristic results in significant increases in lift of a thin supersonic wing at low speed, without adversely effecting intrinsic aerodynamic cleanliness at high speed and hence producing a minimum of drag.

In addition, the device of the present invention has a high degree of structural integrity permitting operational loading of the associated slats at high (transonic) speeds. Such operation is extremely advantages during high speed maneuvers and permits such maneuvers at greater speeds or at a higher g level. This result is attained because of the ability of the pilot to select the most efficient slat configuration during such maneuvers, thus preventing the normally resultant buffeting caused by aerodynamic separation common in present state-of-the-art devices.

It is therefore an object of the present invention to provide apparatus operable to selectively maintain optimum aerodynamic shape and position of associated auxiliary airfoil devices in all desired flight regimes.

Another object of the invention is to provide a system which is fully reversible and stable in any position throughout the operable range and which provides positive locking at all points along its trajectory.

A still further object is to provide a slat activating system in which the most effective aerodynamic configuration is maintained at desired slat positions throughout the extension and retraction cycles.

A yet further object is to provide a system of the above class and character which is easy to manufacture, maintain, service, and is inherently adaptable to environmental conditions, such as space availability in extremely compact, thin, high speed wings.

Other objects and advantages of the invention will become apparent to those skilled in the art from the following description when taken together with the drawings wherein:

FIGURE 2 is a partial, elevational view in cross-section of the wing of FIGURE 1 illustrative of the geometry of the slat nose rotation apparatus in the preferred or converging track embodiment of the present invention in the stowed or retracted position relative to the extending track mechanism;

FIGURE 3 is similar to FIGURE 2 but shows the geometry of the slat rotating means illustrated in FIGURE 2 in the extended position relative to the extending track mechanism;

Figure 1:
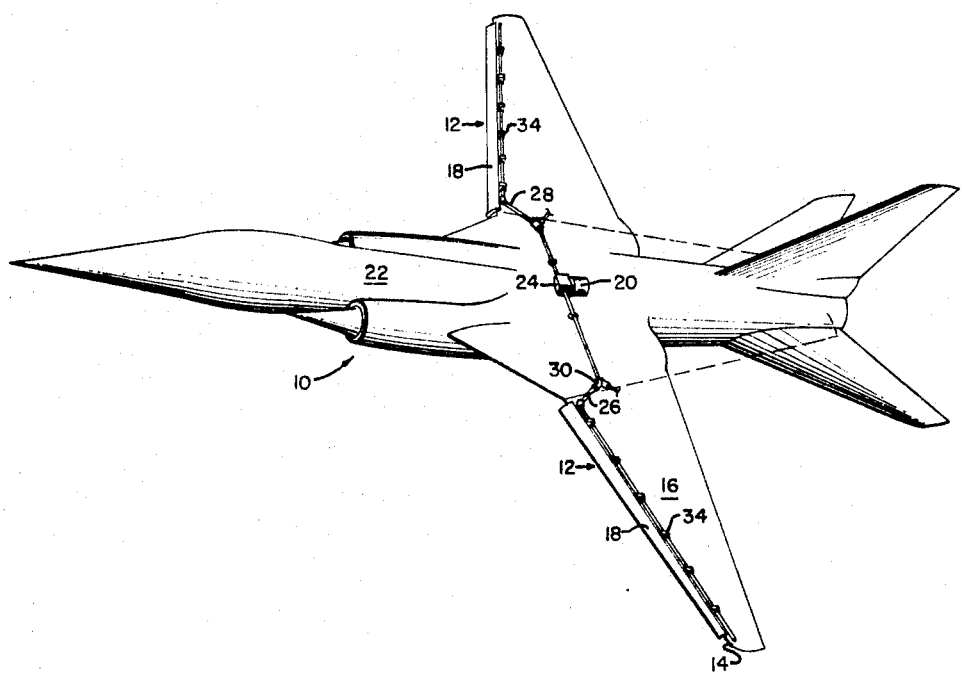
FIGURE 1 is an isometric view of an aircraft having a high speed wing wherein a portion of the wing leading edge is cut away to reveal the drive mechanism of the invention as associated with the slat system.

Referring now to the drawings, FIGURE 1 shows an aircraft 10 provided with slats 12 operably superimposed upon the leading edge 14 of wing 16, slat 12 having a plurality of sections 18. Central hydraulic-electric motor 20 is located, as appropriate, within fuselage 22 of aircraft 10. The torque shaft (not shown) of motor 20 is coupled to reduction type gear box 24 in any conventional manner. Power transmission torque shafts 26 and 28 are attached, respectively, by means of flexible joints 30 to gear box 24. Torque shafts 26 and 28 internally extend into the fixed leading edge 14 of wing 16 in front of, and adjacent to, the first spar 32. Drive shafts 26 and 28 may be introduced into the input shaft of a series of primary gear boxes 34 as, for example, by means of splines (not shown). Primary gear boxes 34 have attached to their output shafts secondary shaft 36 (FIGURE 2), which couples pinion drives 38 mounted in trunnions in any conventional manner (not shown).

It should be noted that in this particular instance, as best seen in FIGURE 2, the slats 12 employ I-beam shaped tracks 40 with their associated drive mechanisms for incrementally extending slats 12 through a predetermined series of positions within the geometry between the stowed and fully extended positions. This geometry is best governed by the track configuration. Further, at least one slat nose rotation mechanism 42 is located with track 40, or, if more than one rotation mechanism is employed, they are positioned adjacent to such tracks at given wing stations. Each pinion drive 38 is mounted conventionally upon an oscillating trunnion, rotatably received within suitable bearing blocks (not shown). Each trunnion has pinion drive 38 supported thereupon by suitable bearings (not shown) within the bearing blocks integral with each trunnion.

Pinion drive 38 penetrates the top of the trunnion and hence engages I-beam track 40 which is slidably mounted within guide rollers 46. I-beam track 40 has integral with the bottom of its lower flange 48 a rack 50 which subsequently meshes with pinion drive 38. Two typical ribs located within the fixed leading edge 14 of wing 16 provide support for both track 40 and nose rotating mechanism 42. In the preferred converging track embodiment of FIGURE 2, the mechanism is comprised of linkage system 44 and associated camming track 56 which determines and programs the geometry, i.e., function performed by linkage 44. As the linkage system is dependent upon the extension mechanism for operation, the description of such linkage system must necessarily begin with I-beam track 40 described above. Track 40 has an appendage fitting 58 mounted at forward terminal 60 thereof. Fitting 58 rotatably receives supplemental fitting 62 which in turn supports trailing portion 64 of the two-piece variable geometry slat 12, and additionally provides a pivot point 66 associated with track 40 to permit rotation of the slat leading portion 68 relative thereto. Leading portion 68 has a spar 32 which has affixed upon the back thereof clevis 70, which is rotatably received by pivot point 66, thus further augmenting rotation of the leading portion 68 of slat 12 relative to the trailing portion 64.

Movement of the leading portion 68 of slat 12 relative to trailing portion 64 is effected and controlled by an adjustable push-pull rod 72 rotatably received at the forward extremity within clevis 74 mounted above clevis 70 upon the rear of spar 32. The opposite extremity 80 is rotatably received by first arm 82 of bell crank 84. Bell crank 84 is supported by and rotates about fixed point 86 within an integral appendage 88 upon I-beam track 40. This results in bell crank 84 being carried through the trajectory described by the movement of track 40. The second arm 90 of bell crank 84 has rotatably mounted thereon a circular cam follower 92 which is entrapped within an adjustable camming track 56. Camming track 56 is positioned within the leading edge of the basic wing upon a rib as above noted.

In operation, still referring to FIGURES 2 and 3, which specifically illustrate the mechanism of the preferred embodiment, the track and slats are shown in the stowed position (FIGURE 2), and high lift or take-off position illustrated in FIGURE 3. Hydro-electric motor 20 provides rotary power to reduction type gear box 24 to which are connected the drive shafts 26 and 28. The power is then transmitted to the outer portion of drive shafts 26 and 28 via universal joints 30. In the interest of simplicity, only one of the slat sections 18 will be described in operation since all are identical in function. Drive shaft 26 transmits rotary motion to secondary drive shaft 36 by means of gear box 34 of which there is at least one for each slat section. Secondary drive shaft 36 has coupled thereto a cooperating pinion drive 38 mounted within suitable bearings in trunnions over which I-beam track 40 passes. This assures constant pinion gear speed at each of the track drive boxes.

A "roll-off" effect is necessary if the proper leading edge geometry is to be maintained during extension and retraction of the slat sections. This is accomplished by varying the diameter of pinion drive 38, thus producing properly controlled differential extension and retraction speeds at each I-beam track 40. Pinion drive 38 is located concentrically within the trunnion at each I-beam track 40. A portion of the addendum circle of each pinion penetrates the upper portion of the trunnion, thus allowing rack 50 upon flange 48 to engage pinion drive 38, which is subsequently immeshed with the pinion gear. Therefore, it follows that the driven pinion's rotation imparts lateral movement to I-beam track 40 which is controlled by guide rollers 46 in accordance with the driven pinion's speed and direction. The tolerances between I-beam track 40 and the track drive are slight, and frictional drag may be reduced by chrome plating the contacting parts and lubricating them with a suitable dry lubricant such as molybdenum disulfide-boric oxide. Driven pinion 38 is rotatably mounted within trunnions as hereinabove stated which are attached to adjacent ribs (not shown). This maintains and assures the proper track and pinion relationship during extension and retraction by allowing track 40 and associated trunnion to oscillate, while maintaining the identical gear-rack relation necessary to prevent binding extension or retraction where the airfoil is dropped through a predetermined path relative to the leading edge. This path is produced by the shape of the aft end of track 40 which is guided and restrained by contact with two adjustable co-axial concentric guide rollers 46 in conjunction with driven pinion 38. Track 40 may be propelled to any desired point throughout the predetermined path and still retain structural integrity.

Slat section 18 has leading portion 68 pivotally attached to slat pivot point 66 on track 40 and is thus extended and retracted by virtue of the relationship of pinion 38, track 40 and slat 12.

Consequently, in operation I-beam track 40 propels slat section 18 toward the extended position, causing integral supporting appendage 88 upon track 40 to remain equidistant in relationship to I-beam track 40, but convergent with the path described by camming track 56. Simultaneously bell crank 84, rotatably mounted upon support appendage 88, is pulled forward causing circular cam follower 92 to travel down camming track 56. Its geometric path is converging with that of I-beam track 40, thus causing second bell crank arm 90 and roller 92 to rotate clockwise about pivot point 86 in an arcuate path.

Subsequently, clockwise rotation of bell crank 84 relative to pivot point 86 results in the first arm 82 of bell crank 84 being driven forward. This motion is relayed by push-pull rod 72 to upper clevis fitting 74 affixed to leading portion 68 of slat section 18. The movement of upper fitting 74 relative to lower fitting 70, hence pivot point 66, causes rotation of leading portion 68 relative to trailing portion 64.

By virtue of the entrapment of circular cam follower 92 in camming track 56, the system is stable anywhere between the stowed (retracted) and extended positions.

Figure 4:
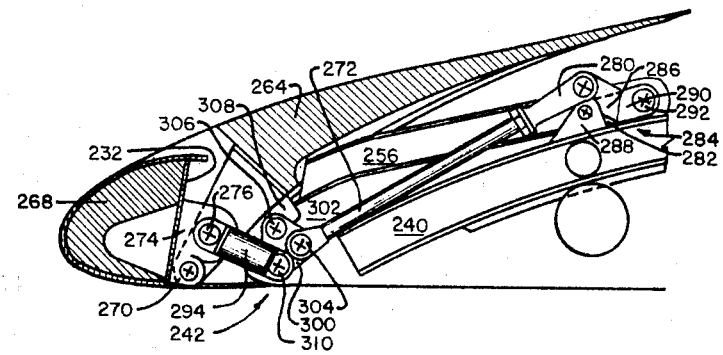
FIGURE 4 is a partial, elevational view in cross-section showing the geometry of a second diverging track embodiment of the invention in the stowed position.
Figure 5:
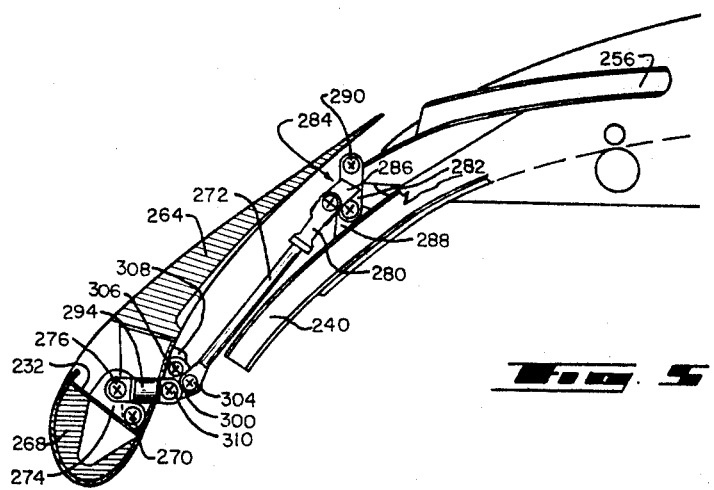
FIGURE 5 shows the geometry of the mechanism illustrated in FIGURE 4 in the extended position, and having the rotatable nose portion in the high lift configuration.

In another embodiment illustrated in FIGURES 4 and 5, camming track 256 is positioned in a diverging trajectory relative to I-beam track 240, rather than in a converging manner as above described. In this embodiment the parts are similar with the exception of the slat leading portion rotating mechanism 242.

Slat leading portion rotating mechanism 242 comprises in combination a push-pull rod linkage 272 having an adjustable rod end 280 rotatably attached to bell crank 284 corresponding to bell crank 84 in the first embodiment. Bell crank 284 is pivotally mounted upon integral appendage 288. Bell crank 284 is Y shaped having three arms 282, 286 and 290. Arm 282 is rotatably attached to integral appendage 288 while arm 286 rotatably receives extremity 280 of push-pull rod 272. The remaining arm 290 has rotatably attached therto a track cam follower 292 corresponding to circular cam follower 92 in the first embodiment. The opposite extremity of push-pull rod 272 is affixed at pivot 304 to a triangular idler 300 rotatably mounted at apex 306 to appendage 308 of support fitting 302, which retains slat 12 trailing portion 264. Idler 300 also has rotatably attached thereto a clevis link 294 which is rotatably affixed to the upper clevis fitting 274 of leading portion 268 of slat 12. The nose portion 268 is rotatably secured to trailing portion 264 at pivot point 270.

In operation, arm 282 of bell crank 284 is pulled away from diverging camming track 256 by virtue of the down and out movement of I-beam track 240. This results in a moment being applied to arm 286 effecting a rotational movement of bell crank 284 about track cam follower 292 on arm 290. This rotational movement drives push-pull rod 272 forward causing triangular idler 300 to rotate forward about pivot point 306, on integral appendage 308, thus engendering arcuate movement to point 310, which drives clevis link 294 forward, resulting in upper cleavis fitting 274 rotating about pivot point 276 upon spar 232. This combination of movements causes leading portion 268 of slat 12 to rotate about pivot 270 relative to slat trailing portion 264.

This second embodiment is specifically adaptable to slats having shallow cross-sections of ultra thin airfoils.

As thus described the present invention is operable to extend or retract a movable two piece variable geometry auxiliary airfoil in a programmed geometrical trajectory relative to the basic wing while simultaneously varying the shape of such airfoil to provide the most efficient aerodynamic configuration for any position within the trajectory and attitude of the craft itself, thereby substantially preventing aerodynamic separation and resultant buffeting during high g maneuvers and affording the optimum aerodynamic position and shape for high lift at low speed and low drag at high speed through variation of the theoretical camber and chord length of both the auxiliary and basic airfoils.

Therefore, what is claimed as new and what is desired to secure by Letters Patent of the United States is:

1. In an airfoil construction of the class wherein a composite airfoil structure is comprised of not less than two airfoil components, the first of which when fully retracted is superimposed upon the leading edge portion of the second in such a manner that an essentially new aerodynamically clean composite airfoil configuration is created, and when extended (forwardly and downwardly) defines still other airfoil configurations, each having aerodynamically useful slats for varying airflow over and about said second airfoil, the improvement comprising:

a mechanical linkage means operable for extending the first airfoil forwardly and downwardly in respect to the second airfoil along a predetermined trajectory sequentially and simultaneously causing said first airfoil to vary in camber and chord in such manner as to provide increased high-lift airflow and inversely for retraction of the first airfoil to the superimposed position, said means comprising in part at least one pair of trajectory establishing support means, at least one of said support means movable relative to the other to establish and define the trajectory of the first airfoil, and a connecting means responsive to relative movement of said support means operative to cause rotation of at least a portion of the first airfoil.

2. An actuating mechanism for moving a biparte aerodynamic slat in respect to a fixed airfoil structure comprising:

A. motive means and propelling means operative to induce motion of said biparte slat and to at least part of an associated linkage system;
B. said linkage system comprising in part an extensible structure linkage arm cooperatively associating the fixed airfoil structure with the biparte slat operative to extend said slat outwardly and downwardly along a predetermined trajectory defined by said linkage system, said extensible linkage arm including at least two non-parallel track guide means, one of said means positioned below said other means and movable longitudinally relative thereto in response to said motive and propelling means; and
C. pivotal means operatively associated with said extensible structural linkage arm and said biparte slat to impart rotational movement to one portion of said slat at and beyond a predetermined point in the programmed trajectory thereof.

3. The actuating mechanism as defined in claim 2 wherein said pivotal means comprises:

A. linkage means integrally attached to said moveable track guide means and operatively cammingly associated with said other guide means;
B. actuating means operatively attached on one end to said linkage means and at the opposite extremity to said biparte slat operative to effect rotational motion of one portion thereof upon longitudinal motion of said movable track guide means.

4. The actuating mechanism as defined in claim 2 wherein said track guide means are convergent.

5. The actuating mechanism as defined in claim 2 whereing said track guide means are divergent.

6. In an airfoil construction of the class wherein a composite airfoil structure is comprised of not less than two airfoil components, the first of which when fully retracted is superimposed upon and forms a substantially integral part of the second in such manner as to create a new composite airfoil structure and configuration, and when extended forwardly and downwardly defines still other airfoil configurations, the improvement comprising:

A. an actuating apparatus operable to extend the first airfoil forwardly and downwardly in respect to the second airfoil along a predetermined trajectory, said apparatus comprising;
  (1) an extensible structural linkage means comprising a plurality of associated support guide members at least one of which is movable and mechanically responsive in movement to the configuration of an associated guide member, said means cooperatively associating the second airfoil structure with the first airfoil structure and defining a downward and outward trajectory path for said first airfoil component; and
  (2) pivotal means responsive to relative motion of said structural linkage means operative to simultaneously and sequentially vary the camber and chord of said first airfoil and consequently the lift of the composite device by effecting a rotational motion to the leading portion of said first airfoil component.

7. Actuating means operative to extend and retract a biparte aerodynamic slat relative to the leading edge of a primary airfoil structure while simultaneously and sequentially varying the chord and camber of both the slat and the primary airfoil structure, said means comprising:

A. operatively associated linkage means including first and second guide members, said first guide member fixedly positioned above said second within the primary airfoil structure, said guide members having a non-parallel relationship one to the other, said second guide member being longitudinally movable relative to said first guide member and the primary airfoil structure and extensible beyond and below the leading edge of the primary airfoil structure, said second guide means integrally and operatively attached to the biparte slat operative to extend the slat in a forward and downward trajectory relative to the longitudinal plane passing through the centerline of the primary airfoil structure;

B. means operatively connected with said first and second guide members and the biparte slat operative to cause rotation of the leading edge portion of said biparte slat during longitudinal movement thereof, said means comprising, in part a linkage means operative rotatably secured at one end to said first and second guide members responsive to longitudinal movement of said second guide member relative to said first guide member, said means operable to impart a rotary motion to the forward leading edge of the biparte slat in response to relative movement between said guide members.

8. Actuating means operative to extend and retract a biparte aerodynamic slat relative to the leading edge of a primary airfoil structure while simultaneously and sequentially varying the chord and camber of both the slat and the primary airfoil structure, said means comprising:

A. linkage means comprising first and second guide members having a convergent relationship one to the other;
  (1) said first guide member being fixedly positioned within the primary airfoil structure,
  (2) said second guide member movably longitudinally positioned within the primary airfoil structure and extensible beyond and below the leading edge thereof in response to a propelling means;
    (a) said second guide member fixedly attached on the forward portion thereof to both portions of the biparte slat;
  (3) rotational motion imparting means operatively associated with said first and second guide means comprising:
    (a) rotatable linkage means having operatively associated first and second arms rotatably joined to said second guide member, said first arm establishing a linkage between said first and second guide members, said first arm slidably received on and guided by said first guide member at the extremity thereof furtherst removed from the point of attachment to said second guide member, said second arm pivotally receiving nose rotation mechanism operatively pivotally attached to the forward rotational portion of the biparte slat,
      said mechanism including rod means pivotally attached to the forward rotational portion of the biparte slat and operative in response to movement of said first and second arms engendered by the relative movement between said first and second guide members to impart rotational motion to the forward portion of the biparte slat.

9. Actuating means operative to extend and retract a biparte aerodynamic slat relative to the leading edge of a primary airfoil structure while simultaneously and requentially varying the chord and camber of both the slat and the primary airfoil structure, said means comprising:

A. linkage means comprising first and second guide members having a divergent relationship one to the other,
  (1) said first guide member fixedly positioned within the primary airfoil structure,
  (2) said second guide member longitudinally movably positioned within the primary airfoil structure and extensible beyond and below the leading edge thereof;
    said second guide member fixedly attached at one end to the biparte slat trailing portion and pivotally to the biparte slat rotatable portion,
  (3) means imparting rotational motion operatively associated with said first and second guide members comprising:
    (a) linkage means pivotally attached to said second guide member at a location remote from said fixed attachment point of said second guide member, said means having first, second and third arms,
      said first arm pivotally secured to said said second guide member and fixedly to said second arm,
      said second arm slidably rotatably secured to said first guide member and operative to impart rotational motion to said arms responsive to sliding engagement with said first guide member,
      said third arm fixedly secured at one end to said first and second arms and pivotally receiving adjustable motion transmitting means,
      an idler member pivotally secured to the trailing portion of the biparte slat and to said adjustable motion transmitting means, said idler rotatably receiving second motion transmitting means pivotally secured to the rotatable nose portion of the biparte slat operative to cause the nose portion to rotate about said second guide member slat pivot attachment point.

References Cited by the Examiner

UNITED STATES PATENTS

| | | | |
|---|---|---|---|
| 1,631,259 | 6/1927 | Gilmore | 244—42 |
| 1,890,059 | 12/1932 | Lake | 244—44 X |
| 2,365,382 | 12/1944 | Bolkow | 244—42 |
| 2,755,039 | 7/1956 | Davie | 244—42 |
| 3,134,562 | 5/1964 | Hovgard | 244—42 X |

FOREIGN PATENTS

| | | |
|---|---|---|
| 404,149 | 1/1934 | Great Britain. |
| 878,657 | 1/1943 | France. |

MILTON BUCHLER, *Primary Examiner.*

B. BELKIN, *Assistant Examiner.*